United States Patent
Mokhoria

(10) Patent No.: US 11,104,273 B2
(45) Date of Patent: Aug. 31, 2021

(54) ARRANGEMENT TO PREVENT ERRONEOUS IMAGE ORIENTATION FOR REAR VIEW CAMERA

(71) Applicant: Robert Bosch GmbH, Stuttgart (DE)

(72) Inventor: Alexander Mokhoria, Guelph (CA)

(73) Assignee: Robert Bosch GmbH, Stuttgart (DE)

( * ) Notice: Subject to any disclaimer, the term of this patent is extended or adjusted under 35 U.S.C. 154(b) by 702 days.

(21) Appl. No.: 15/373,320

(22) Filed: Dec. 8, 2016

(65) Prior Publication Data

US 2018/0162276 A1 Jun. 14, 2018

(51) Int. Cl.
| | |
|---|---|
| B60R 1/00 | (2006.01) |
| H04N 5/232 | (2006.01) |
| B60K 35/00 | (2006.01) |
| G06K 9/00 | (2006.01) |

(52) U.S. Cl.
CPC ............... *B60R 1/00* (2013.01); *B60K 35/00* (2013.01); *G06K 9/00791* (2013.01); *H04N 5/232* (2013.01); *H04N 5/23245* (2013.01); *B60K 2370/21* (2019.05); *B60R 2300/30* (2013.01); *B60R 2300/8066* (2013.01)

(58) Field of Classification Search
CPC ............... B60R 1/00; B60R 2300/30; B60R 2300/8066; B60K 35/00; B60K 2350/2013; G06K 9/00791
USPC ........................................................ 348/148
See application file for complete search history.

(56) References Cited

U.S. PATENT DOCUMENTS

| | | | | | |
|---|---|---|---|---|---|
| 4,203,154 | A | * | 5/1980 | Lampson | ............... G06K 15/10 345/26 |
| 6,172,686 | B1 | * | 1/2001 | Mizutani | ................... G06T 1/20 345/213 |

(Continued)

FOREIGN PATENT DOCUMENTS

| | | |
|---|---|---|
| CN | 1758364 A | 4/2006 |
| CN | 101552865 A | 10/2009 |

(Continued)

OTHER PUBLICATIONS

Notice of Preliminary Rejection for the Korean Intellectual Property Office for Application No. 10-2019-7016390 dated Mar. 3, 2020 (8 pages).

(Continued)

*Primary Examiner* — Jae N Noh
(74) *Attorney, Agent, or Firm* — Michael Best & Friedrich LLP

(57) ABSTRACT

A method of operating a rear video camera includes a non-volatile memory for storing information and a video imager configured to load information from the non-volatile memory and to obtain video signals with video images from a field of view rearward of a vehicle. The video imager is configured to output an enable signal at a pin of the video imager when the information is loaded onto the video imager from the non-volatile memory and to output video signals. A video buffer is configured to receive the video signals and the enable signal from the video imager and to output video signals to an interior vehicle display when the enable signal is received. When the information is not loaded onto the video imager, the video imager does not provide an enable signal and no image is displayed.

17 Claims, 6 Drawing Sheets

(56) References Cited

U.S. PATENT DOCUMENTS

| | | | |
|---|---|---|---|
| 6,636,233 B1 * | 10/2003 | Mizutani | G06T 15/50 |
| | | | 345/637 |
| 2004/0189448 A1 | 9/2004 | Eggers et al. | |
| 2005/0286740 A1 | 12/2005 | Sigle | |
| 2008/0136911 A1 * | 6/2008 | Shaffer | H04N 7/181 |
| | | | 348/148 |
| 2009/0066793 A1 | 3/2009 | Takeda | |
| 2013/0088596 A1 | 4/2013 | Raita et al. | |
| 2015/0165975 A1 | 6/2015 | Meadows | |
| 2016/0159283 A1 | 6/2016 | Lynam | |

FOREIGN PATENT DOCUMENTS

| | | |
|---|---|---|
| CN | 101861255 A | 10/2010 |
| GB | 2351055 A | 12/2000 |
| JP | 2014116963 A | 6/2014 |
| JP | 2015105968 A | 6/2015 |
| KR | 20000076686 A | 12/2000 |

OTHER PUBLICATIONS

Translation of the Notification of Reasons for Refusal from the Japanese Patent Office for Application No. 2019-530779 dated Jul. 8, 2020 (3 pages).

Translation of the National Intellectual Property Administration People's Republic of China First Office Action for Application No. 201780075735.2 dated Jun. 1, 2020 (16 pages).

\* cited by examiner

ARRANGEMENT TO PREVENT ERRONEOUS IMAGE ORIENTATION FOR REAR VIEW CAMERA

BACKGROUND

The present invention relates to an arrangement to prevent an erroneous image orientation for a video image from a rear view camera that is displayed to a vehicle operator.

Prior art vehicle display systems include a controller adapted to process signals provided to a display. A camera may be programmed to automatically output digitized images with an orientation of −180 degrees as set forth in U.S. Pat. Pub. 2008/0136911. In some instances, when the camera fails to operate properly, the images provided to the vehicle display are displayed without being mirrored or reversed. Thus, a display viewed by a vehicle operator shows an object as being on the right in the display, when the object is actually located on the left to the rear of a vehicle. In this instance, a vehicle operator driving in reverse may steer toward the object instead of avoiding the object. An object of the invention includes ensuring that the proper orientation of the images is displayed to a vehicle operator, and providing no images to an interior vehicle display in the event that the orientation of the images is not accurate.

SUMMARY

In one embodiment, the invention provides a method of preventing an interior vehicle display from displaying video images provided by a rear video camera having an erroneous image orientation. The method includes determining whether a non-volatile memory provides information to a video imager of the rear video camera, providing an enable signal from the video imager to a video buffer when the information in the non-volatile memory is provided to the video imager, and not providing the enable signal from the video imager to the video buffer when the information in the non-volatile memory is not provided to the video imager. The video signals are provided from the video imager through the video buffer to an interior vehicle display when the video buffer receives the enable signal.

In one embodiment, providing of the information from the non-volatile memory into the video imager includes horizontally reversing the orientation of the video images for the video signals that are output from the video imager. In another embodiment, the non-volatile memory includes a flash memory, and wherein the video imager, the flash memory and the video buffer are provided on a single circuit board of the rear video camera. In one embodiment, the video imager, the non-volatile memory and the video buffer are provided on a single circuit board of the rear video camera.

Another embodiment provides a rear video camera including a non-volatile memory for storing information, and a video imager configured to load the information from the non-volatile memory, to obtain video signals with video images from a field of view rearward of a vehicle and to output the video signals, the video imager configured to output an enable signal at a pin of the video imager when the information is loaded onto the video imager from the non-volatile memory. A video buffer is configured to receive the video signals and the enable signal from the video imager and to output the video images of the video signals when the enable signal is received. In one embodiment, the information loaded from the non-volatile memory into the video imager includes operating settings that include horizontally reversing an orientation of the video images of the video signals that are output from the video imager, and the video buffer is configured to block output of the video signals when the enable signal from the video imager is not received.

In one embodiment, a vehicle video camera display system includes a rear video camera mounted near a rear of a vehicle, the rear video camera having a field of view outwardly from the rear of the vehicle. The rear video camera includes a non-volatile memory for storing information, a video imager configured to obtain video signals of video images from rearward of a vehicle and to load the information from the non-volatile memory, the video imager configured to provide an enable signal at a pin of the video imager when the information is loaded onto the video imager; and a video buffer configured to receive the video signals and the enable signal, and to output the video signals having the video images when the enable signal is received. The system includes an interior vehicle display configured to receive and display a video image from the video signals received from the video buffer.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
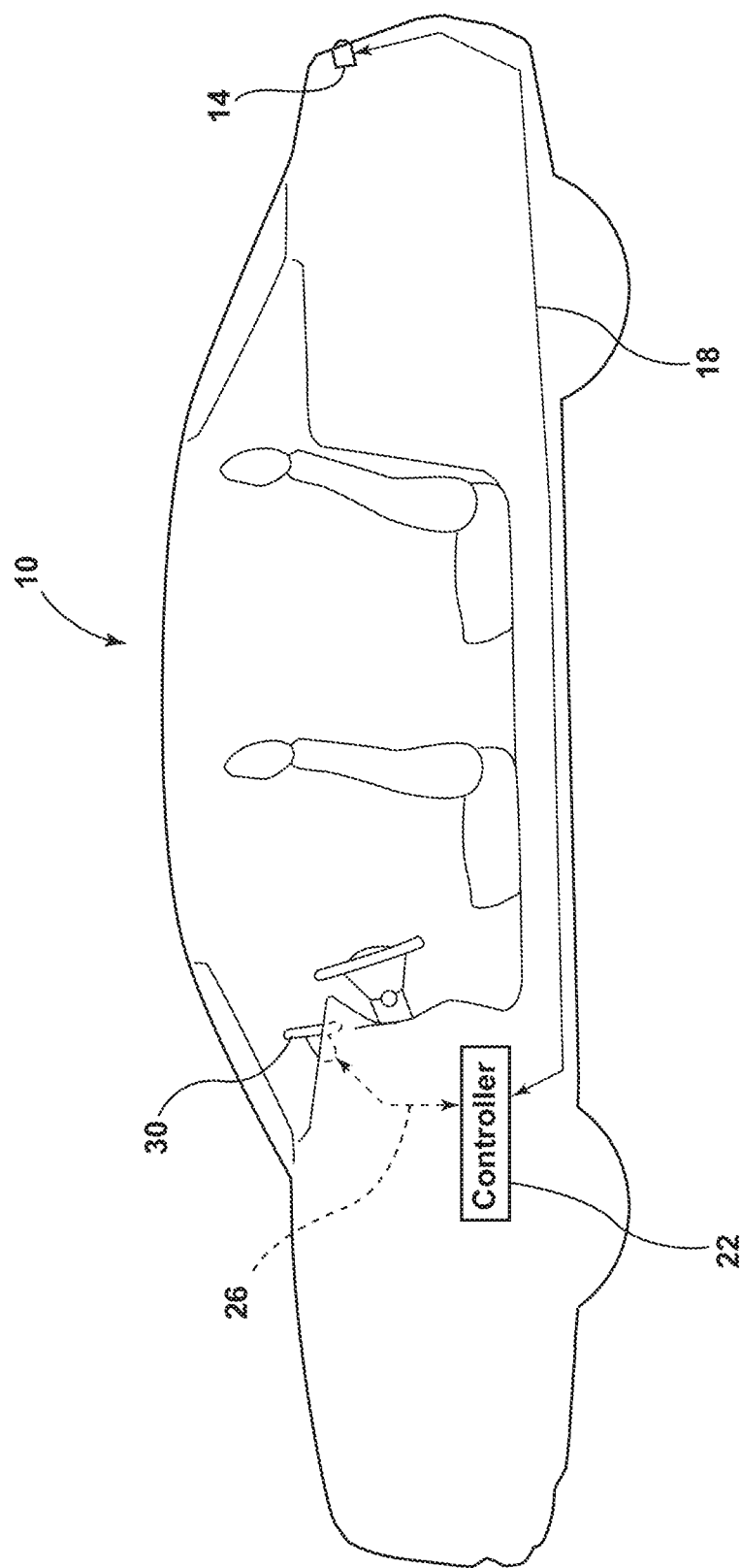
FIG. 1 is a side view of one embodiment of a vehicle having a rear video camera and a display system.

FIG. 1 shows a vehicle 10 having a rear video camera 14 mounted onto or secured near a rear bumper of the vehicle. The rear video camera 14 is oriented to sense images outwardly from the vehicle and obtain video images for video signals from a field of view rearward of the vehicle 10. Further, FIG. 1 shows a cable 18 providing video signals from the rear video camera 14 to a video controller 22. The video controller 22 is configured to selectively provide the video signals to an interior vehicle display 30 to display video images. For instance, in one embodiment the video controller 22 provides the video signals via a communications link 26 to the interior vehicle display 30 when the vehicle 10 is shifted into a reverse gear. In one embodiment, the communications link 26 is one or more wires or a cable. In another embodiment, the communications link 26 is a wireless video signal.

Figure 2:
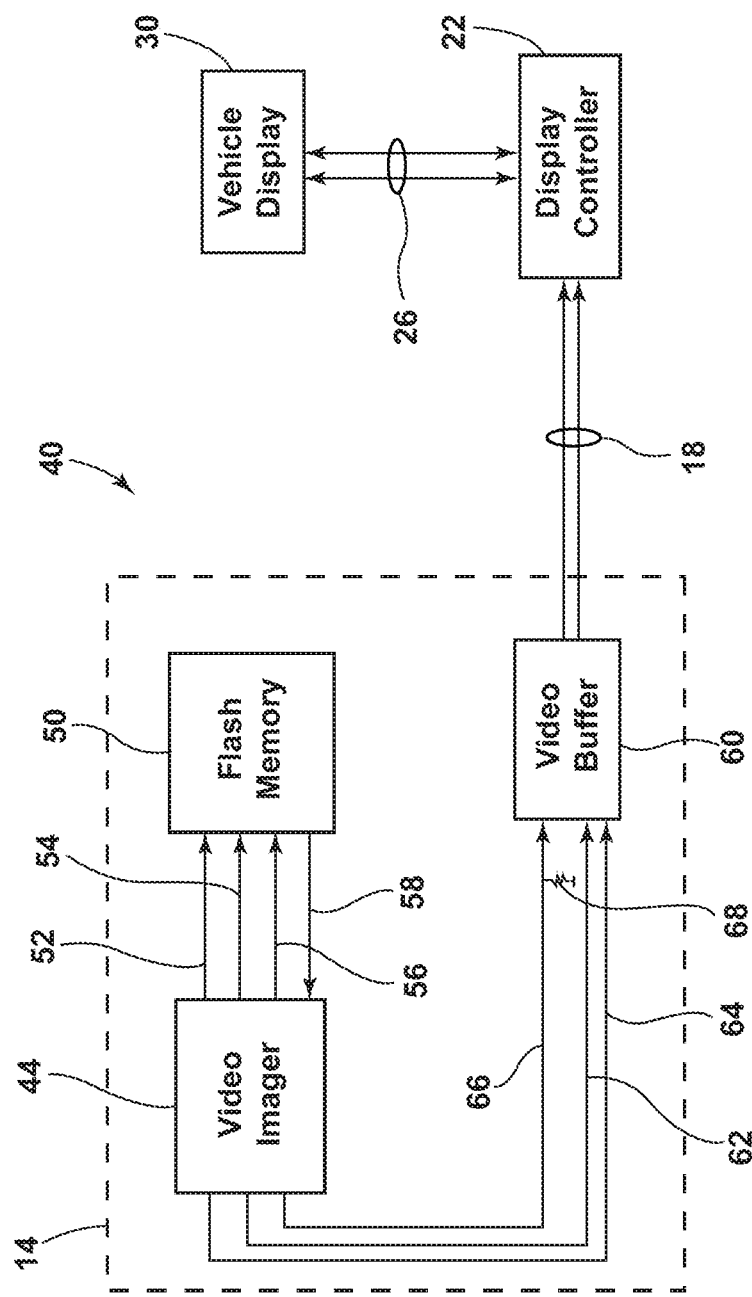
FIG. 2 is block diagram of one embodiment of a vehicle video camera display system.

FIG. 2 shows a block diagram 40 of a vehicle video camera display system. The block diagram 40 of FIG. 2 includes a video imager 44 connected to a flash memory 50.

A clock signal line 52 (SPI_CLK) provides a clock signal to the flash memory 50. A master output/slave input line 54 (SPI_MOSI) provides an input to the flash memory 50. Another chip signal line 56 (SPI_CS) provides a chip signal to the flash memory 50. Finally a master input/slave output signal line 58 (SPI_MISO) provides information from the flash memory 50 for loading by the video imager 44. While a flash memory 50 is shown in FIG. 2, other types of non-volatile memory are contemplated for communication with a serial peripheral interface (SPI). In other embodiments, an inter-integrated circuit (I²C) interface, a parallel interface, or another interface is provided for the vehicle video camera display system. The signal lines 52, 54, 56, 58 represent connections that connect pins of the video imager 44 with pins of the flash memory 50.

FIG. 2 also shows a video buffer 60 connected to the video imager 44 by video signal lines 62, 64 and by an enable signal line or connecter 66. In FIG. 2, the video buffer 60 provides video signals via the cable 18 to the display controller 22. The display controller 22 selectively provides video signals/video images or other information to the interior vehicle display 30 via communications link 26. The enable signal line 66 includes a resistor or other circuit element 68 that connects to ground and acts as a pull-down resistor in one embodiment. When there is no output on the enable signal line 66, the resistor 68 provides a pull-down to ground for an input/output pin EN of the video buffer 60.

In one embodiment, the video imager 44, the flash memory 50, and the video buffer 60 are disposed within a video camera housing of the rear video camera 14. The embodiment includes providing the video imager 44, the flash memory 50 and the video buffer 60 on a single circuit board. In another embodiment, two or more circuit boards are provided.

Figure 3:
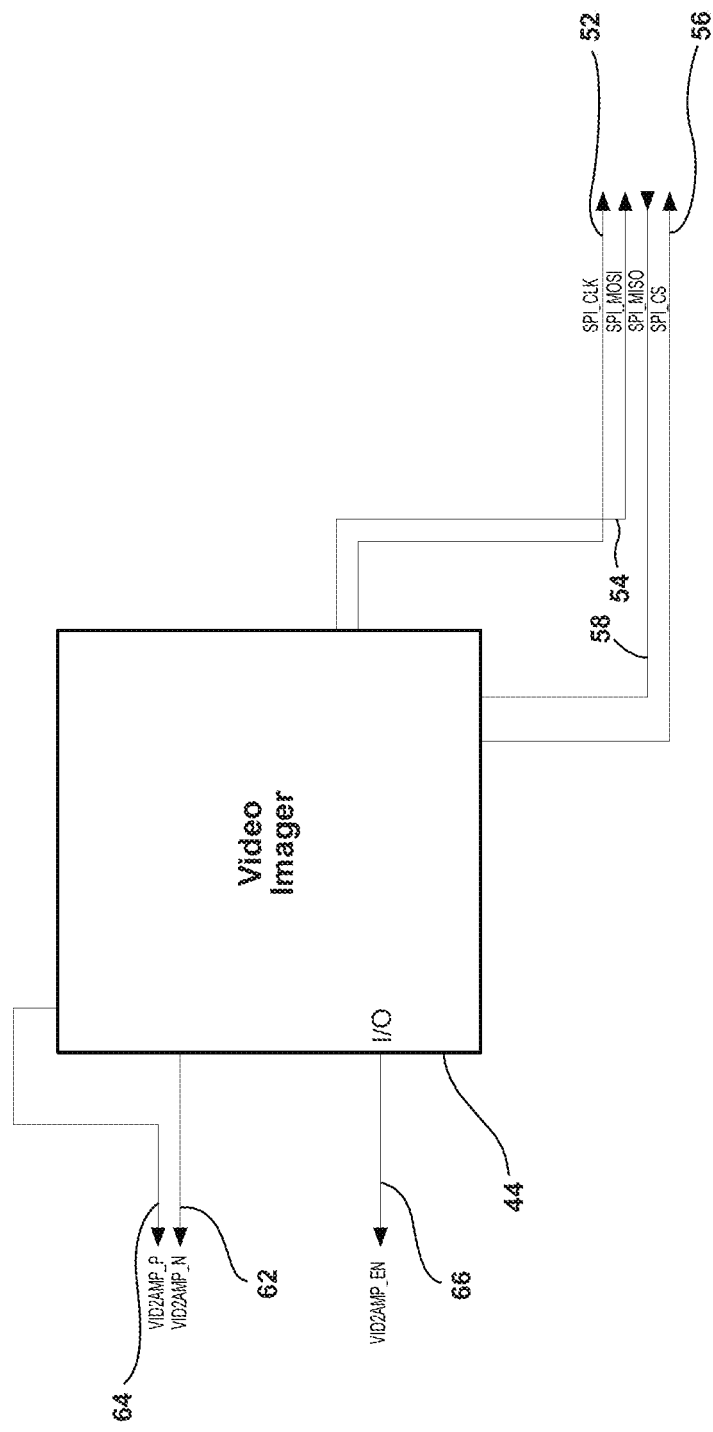
FIG. 3 is a schematic diagram of an embodiment of a video imager and connections thereto.
Figure 4:
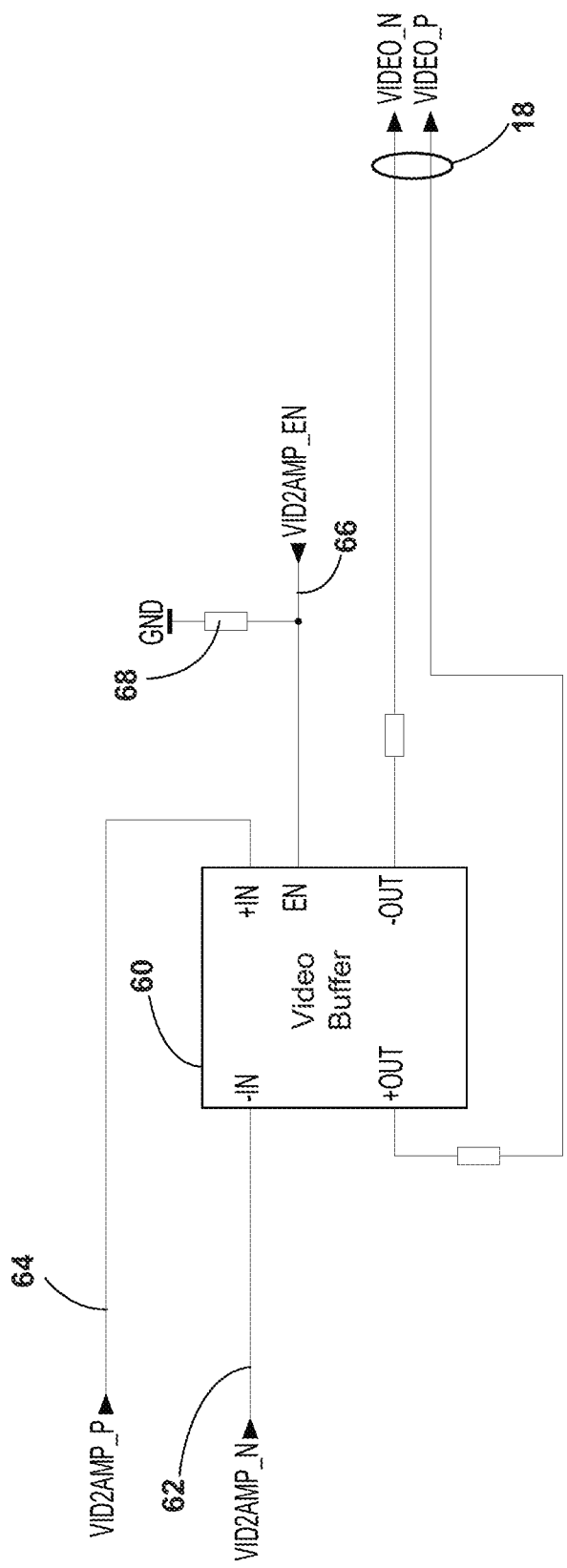
FIG. 4 is a schematic diagram of an embodiment of a flash memory and connections thereto.
Figure 5:
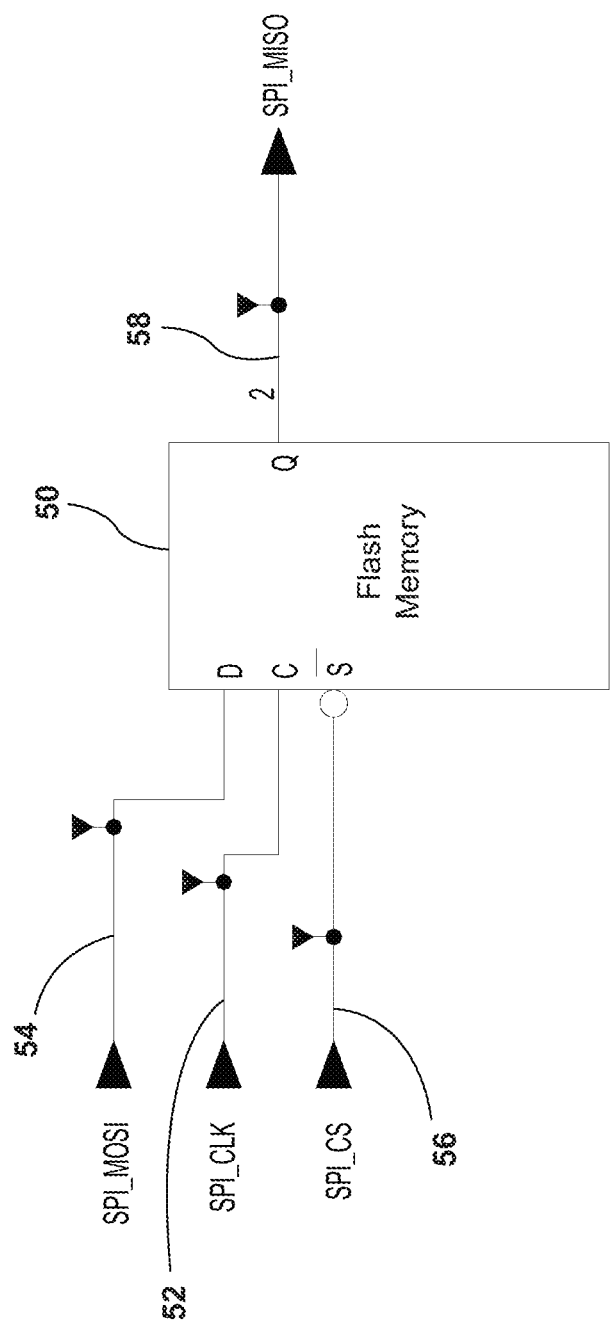
FIG. 5 is a schematic diagram of an embodiment of a video buffer and connections thereto.

FIG. 3 shows one embodiment of a schematic circuit for the video imager 44 and various input pins and output pins thereof. FIG. 4 shows an embodiment of a schematic circuit for the video buffer 60 including elements connected thereto. FIG. 5 shows an embodiment of a schematic circuit for a flash memory 50 for storing information. An enable signal is provided to a trace or connection 66 connected at a first end to a pin I/O of the video imager 44 as shown in FIG. 3. The trace 66 is connected at a second end to a pin EN of the video buffer 60 as shown in FIG. 4, along with the pull-down resistor 68.

OPERATION

In operation, the video imager 44, which includes a processor, application specific integrated circuit (ASIC) or other processing circuitry (not shown), is configured to provide a clock signal on clock signal line 52 to the flash memory 50 to synchronize therewith. Further, the video imager 44 is configured to provide an input signal to the flash memory 50 on master output/slave input line 54 and a chip signal to the flash memory on chip signal line 56. In response, the flash memory 50 is configured to provide information for loading into the video imager 44, such as data including operating settings for the operation of the video imager 44, on master input/slave output signal line 58.

The video imager 44 is configured to load information from the flash memory 50. Based upon the received or loaded information, the video imager 44 is configured to horizontally reverse the video images horizontally by 180 degrees. By horizontally reversing the video images, the video images from the video signals will correspond to viewing a rear view mirror from the perspective of an operator of the vehicle 10 when displayed forwardly on the interior vehicle display 30 of the vehicle 10. The reversed images are output from the video imager 44 as video signals on video signal lines 62, 64. In response to the loaded information, the video imager 44 is also configured to provide an enable signal on pin I/O thereof. Pin I/O is an input/output pin of the video imager 44 configured as an input by default. The enable signal VID2AMP_EN is transmitted from pin I/O via the enable signal line 66 to input pin EN of the video buffer 60.

Figure 6:
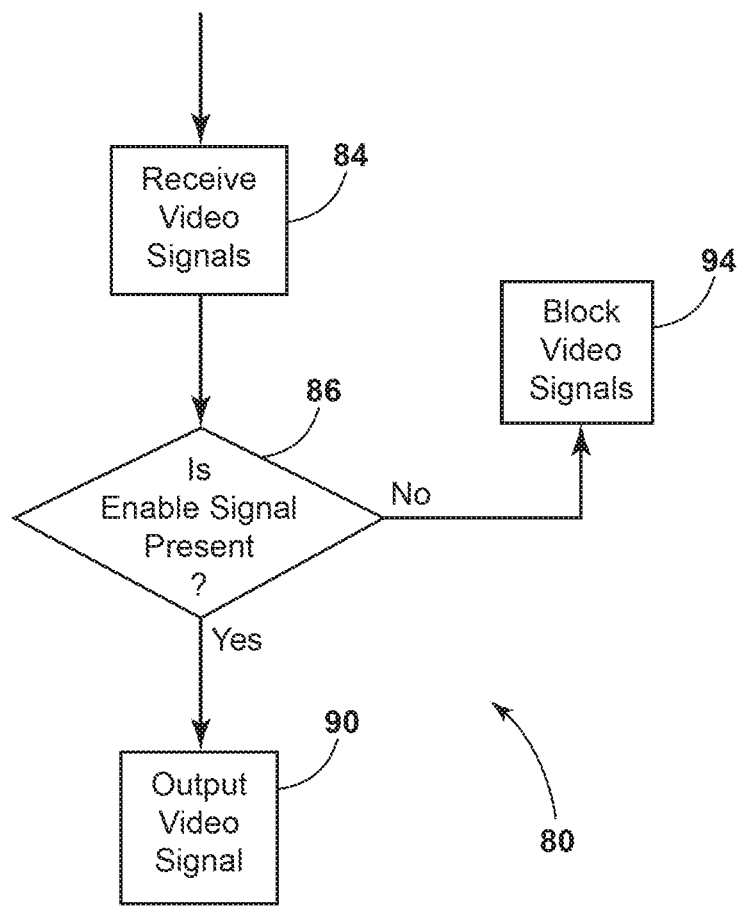
FIG. 6 is a flow chart for operation of the video buffer.

The video buffer 60 is an integrated circuit. The video buffer 60 is configured to operate as shown in the flow chart 80 of FIG. 6. The video buffer receives video signals from the video imager 44 on video signal lines 62, 64 (step 84). The video buffer 60 is configured to determine whether an enable signal VID2AMP_EN is received at the pin EN (step 86). When the enable signal is received, the video buffer 60 is informed that the video imager 44 of the video camera 14 is operating properly. Therefore, the video buffer 60 outputs the video signals received from video signal lines 62, 64 on cable 18 (step 90). The cable 18 provides the video signals on one or more signal lines in National Television System Committee (NTSC) video format. Other video formats are contemplated. The video signals are provided to the display controller 22. The display controller 22 controls the output of the video images from the video camera 14 to the interior vehicle display 30. Accordingly, when the enable signal is present, the video buffer 60 provides the video signals to the display controller 22 for selective display on the interior vehicle display 30.

In an instance wherein the video buffer determines that the flash memory 50 is not properly loaded into the video imager 44 as the enable signal is not output on signal line 66 (decision step 86 in FIG. 6), the video signals are blocked and not output by the video buffer (step 94). The video images are blocked by the video buffer 60 as the video images are output by the video imager 44 without a 180 degree adjustment. Thus, if the video image was then provided to the interior vehicle display 30, the video image would be a reversed mirror image for a user viewing on the forwardly oriented interior vehicle display 30. More specifically, when the enable signal is not received at pin EN of the video buffer 60, the resistor 68 pulls down the voltage at the pin EN shown in FIG. 4. Without the enable signal at the pin EN, the video buffer 60 does not output the received video signals. Thus, no video signals are provided on cable 18. Therefore, in the instance that the information on the flash memory 50 is not loaded into the video imager 44, no video signal is output by the video buffer 60. Accordingly, an erroneous image orientation for a video signal is not provided to the interior vehicle display 30 via the display controller 22. Therefore, the lack of an enable signal prevents the interior vehicle display 30 from displaying rear video images provided by the rear video camera 14 with an erroneous image orientation.

In operation, the display controller 22 provides the video signals to the interior vehicle display 30 when the vehicle 10 is shifted into reverse gear or in other situations, such as a vehicle user selecting viewing of rear video images from the vehicle with a touch screen or other user interface.

In some embodiments, signal lines 52, 54, 56, 58, 62, 64, 66 provide connections that connect respective pins of the video imager 44, the flash memory 50, and the video buffer 60 with corresponding pins of each other for communication therebetween. Each signal line 52, 54, 56, 58, 62, 64, 66 is a trace, connection or wire in the embodiments.

In one embodiment, the rear video camera 14 is a digital video camera having an analog interface, although other types of cameras are contemplated. The video camera 14 can be a rear video camera or a surround view video camera of a surround view video camera system.

Thus, the invention provides, among other things, a rear video camera and method of operating the camera to provide video signals from a video imager through a video buffer to an interior vehicle display when the video buffer receives the enable signal, wherein the enable signal is provided when information from a non-volatile memory is loaded into the video imager that includes horizontally reversing the orientation of the video images for the video signals that are output from the video imager. Thus, the method prevents improperly oriented video images from being displayed. Various features and advantages of the invention are set forth in the following claims.

What is claimed is:

1. Method of preventing an interior vehicle display from displaying video images provided by a rear video camera having an erroneous image orientation, comprising:
    determining whether a non-volatile memory is providing information to a video imager of the rear video camera;
    providing an enable signal from the video imager to a video buffer when the information in the non-volatile memory is provided to the video imager, and not providing the enable signal from the video imager to the video buffer when the information in the non-volatile memory is not provided to the video imager; and
    providing video signals from the video imager through the video buffer to an interior vehicle display when the video buffer receives the enable signal.

2. The method according to claim 1, wherein the providing of the information from the non-volatile memory into the video imager includes horizontally reversing the orientation of the video images for the video signals that are output from the video imager.

3. The method according to claim 2, wherein the non-volatile memory includes a flash memory, and wherein the video imager, the flash memory and the video buffer are provided on a single circuit board of the rear video camera.

4. The method according to claim 1, wherein the video imager, the non-volatile memory and the video buffer are provided on two or more circuit boards of the rear video camera.

5. The method according to claim 1, including displaying the video images of the video signals from the video imager on the interior vehicle display when the video buffer receives the enable signal.

6. The method according to claim 1, wherein the non-volatile memory includes a flash memory and the enable signal is provided on a connection from an input/output pin of the video imager to an input pin of the video buffer.

7. A rear video camera comprising:
    a non-volatile memory for storing information;
    a video imager configured to load the information from the non-volatile memory, to obtain video signals with video images from a field of view outwardly from a vehicle and to output the video signals, the video imager configured to output an enable signal at a pin of the video imager when the information is loaded onto the video imager from the non-volatile memory; and
    a video buffer configured to receive the video signals and the enable signal from the video imager and to output the video images of the video signals when the enable signal is received,
    wherein the information loaded from the non-volatile memory into the video imager includes operating settings to alter an orientation of the video images of the video signals that are output from the video imager, and wherein the video buffer is configured to block output of the video signals when the enable signal from the video imager is not received.

8. The rear video camera according to claim 7, wherein the operating settings horizontally reverse the orientation of the video images of the video signals that are output from the video imager.

9. The rear video camera according to claim 7, wherein the non-volatile memory includes a flash memory.

10. The rear video camera according to claim 7, wherein the enable signal is provided to a trace connected at a first end to the pin of the video imager, the trace being connected at a second end to a pin of the video buffer.

11. The rear video camera according to claim 7, wherein the video imager is configured to alter the orientation of the video images by reversing the video images of the video signals in response to the information loaded from the non-volatile memory, and wherein the video imager is configured to not reverse the video images of the video signals when the information is not loaded from the non-volatile memory.

12. The rear video camera according to claim 11, wherein the video imager, the non-volatile memory and the video buffer are provided on a single circuit board.

13. The rear video camera according to claim 12, wherein the pin of the video imager is an input/output pin, the non-volatile memory includes a flash memory, and the enable signal is provided on a connection from the input/output pin of the video imager to an input pin of the video buffer.

14. A vehicle video camera display system comprising:
    a rear video camera mounted on a vehicle, the rear video camera having a field of view outwardly from the vehicle, the rear video camera including:
        a non-volatile memory for storing information;
        a video imager configured to obtain video signals of video images from rearward of a vehicle and to load the information from the non-volatile memory, the video imager configured to provide an enable signal at a pin of the video imager when the information is loaded onto the video imager; and
        a video buffer configured to receive the video signals and the enable signal, and to output the video signals having the video images when the enable signal is received,
    and
    an interior vehicle display configured to receive and display a video image from the video signals received from the video buffer,
    wherein in response to the receiving of the information from the non-volatile memory into the video imager, the video imager is configured to horizontally reverse the orientation of the video images of the video signals that are output from the video imager, and wherein the video buffer is configured to block output of the video signals when the enable signal from the video imager is not received.

15. The vehicle video camera display system according to claim 14, wherein the non-volatile memory includes a flash memory.

16. The vehicle video camera display system according to claim 15, wherein the enable signal is provided by a connection from the pin of the video imager to a pin of the video buffer.

17. The vehicle video camera display system according to claim 16, wherein the video imager is configured to not reverse the video images for the video signals that are output when the information is not loaded from the non-volatile memory into the video imager.

* * * * *